J. R. KEY.
ROAD GRADER.
APPLICATION FILED AUG. 15, 1917.

1,328,233.

Patented Jan. 13, 1920.
4 SHEETS—SHEET 1.

INVENTOR
John R. Key
BY
ATTORNEY

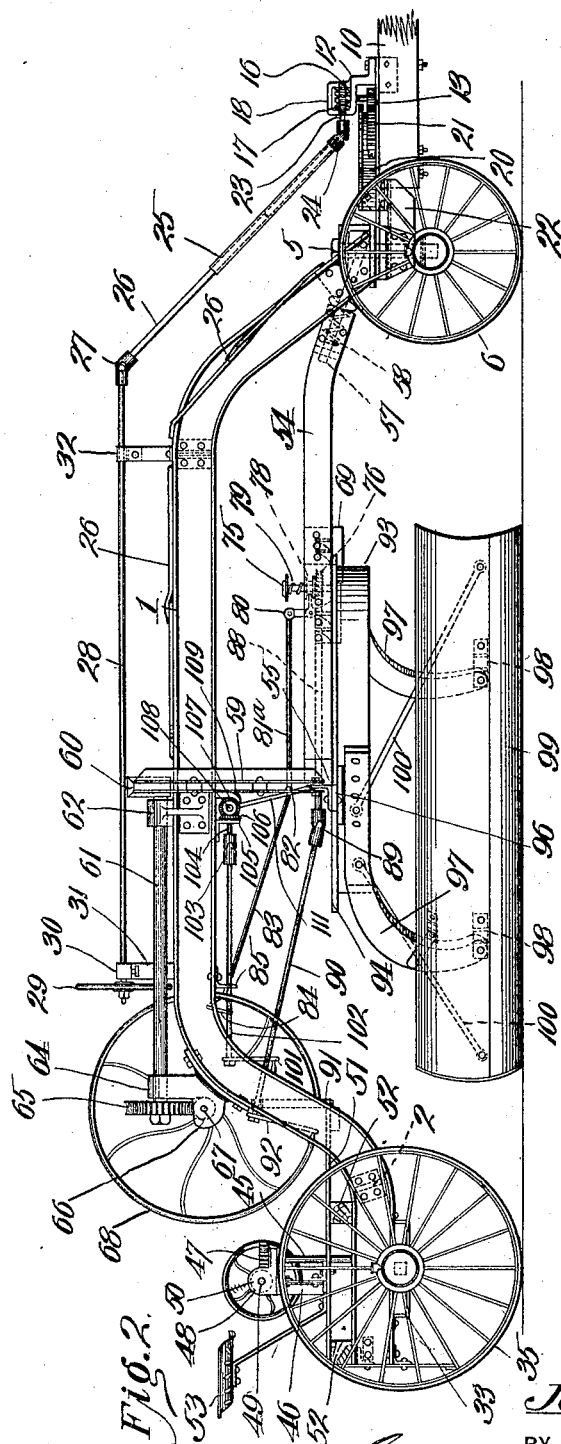

J. R. KEY.
ROAD GRADER.
APPLICATION FILED AUG. 15, 1917.
1,328,233.
Patented Jan. 13, 1920.
4 SHEETS—SHEET 3.
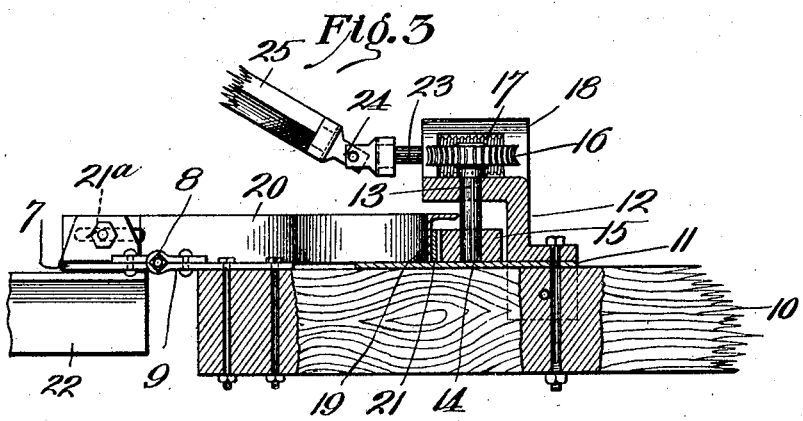
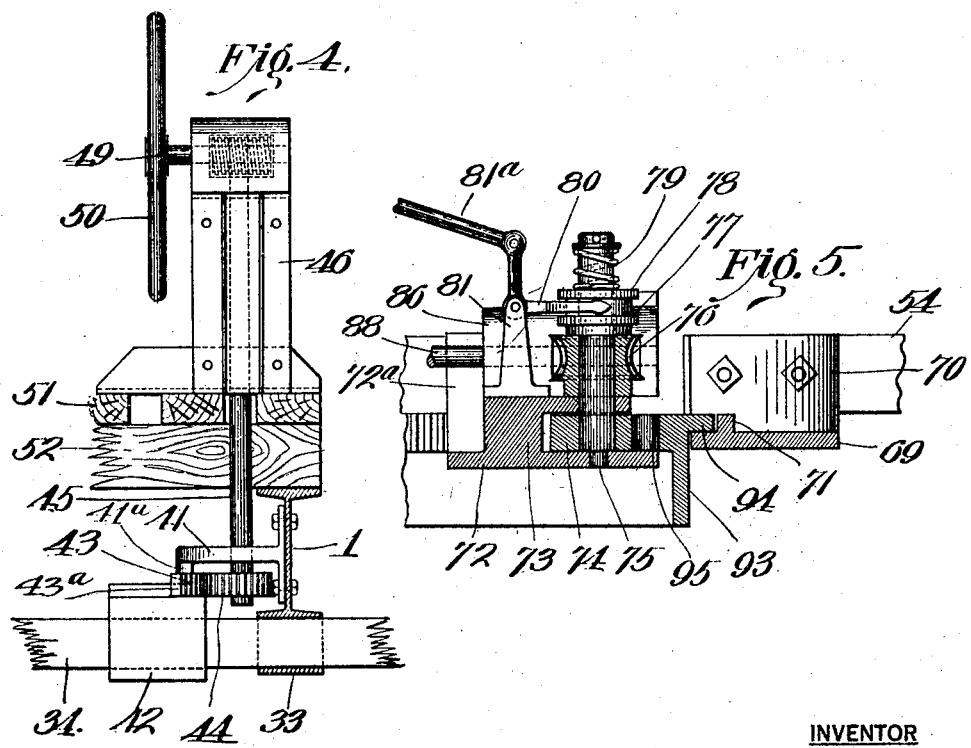
INVENTOR
John R. Key.
BY
George ...
ATTORNEY

J. R. KEY.
ROAD GRADER.
APPLICATION FILED AUG. 15, 1917.

1,328,233.

Patented Jan. 13, 1920.

INVENTOR
John R. Key.
BY
George Y. Thorpe
ATTORNEY

UNITED STATES PATENT OFFICE.

JOHN R. KEY, OF LEAVENWORTH, KANSAS.

ROAD-GRADER.

1,328,233.   Specification of Letters Patent.   Patented Jan. 13, 1920.

Application filed August 15, 1917. Serial No. 186,409.

*To all whom it may concern:*

Be it known that I, JOHN R. KEY, a citizen of the United States, residing at Leavenworth, in the county of Leavenworth and State of Kansas, have invented certain new and useful Improvements in Road-Graders, of which the following is a specification.

This invention relates to road grading machines, and has for its object to produce a machine having efficient means for rotating the scraper blade manually or permitting it to be rotated through the engagement with the ground while the machine is in motion.

With this general object in view, the invention consists in certain novel and peculiar features of construction and organization of parts as hereinafter described and claimed, and in order that it may be fully understood reference is to be had to the accompanying drawings, in which:

Fig. 2, is a side view of the same.

Fig. 3, is an enlarged vertical section taken approximately on the line III—III of Fig. 1.

Fig. 4, is an enlarged vertical section taken approximately on the dotted line IV of Fig. 1.

Fig. 5, is an enlarged vertical section taken approximately on the line V—V of Fig. 1.

Figure 1:
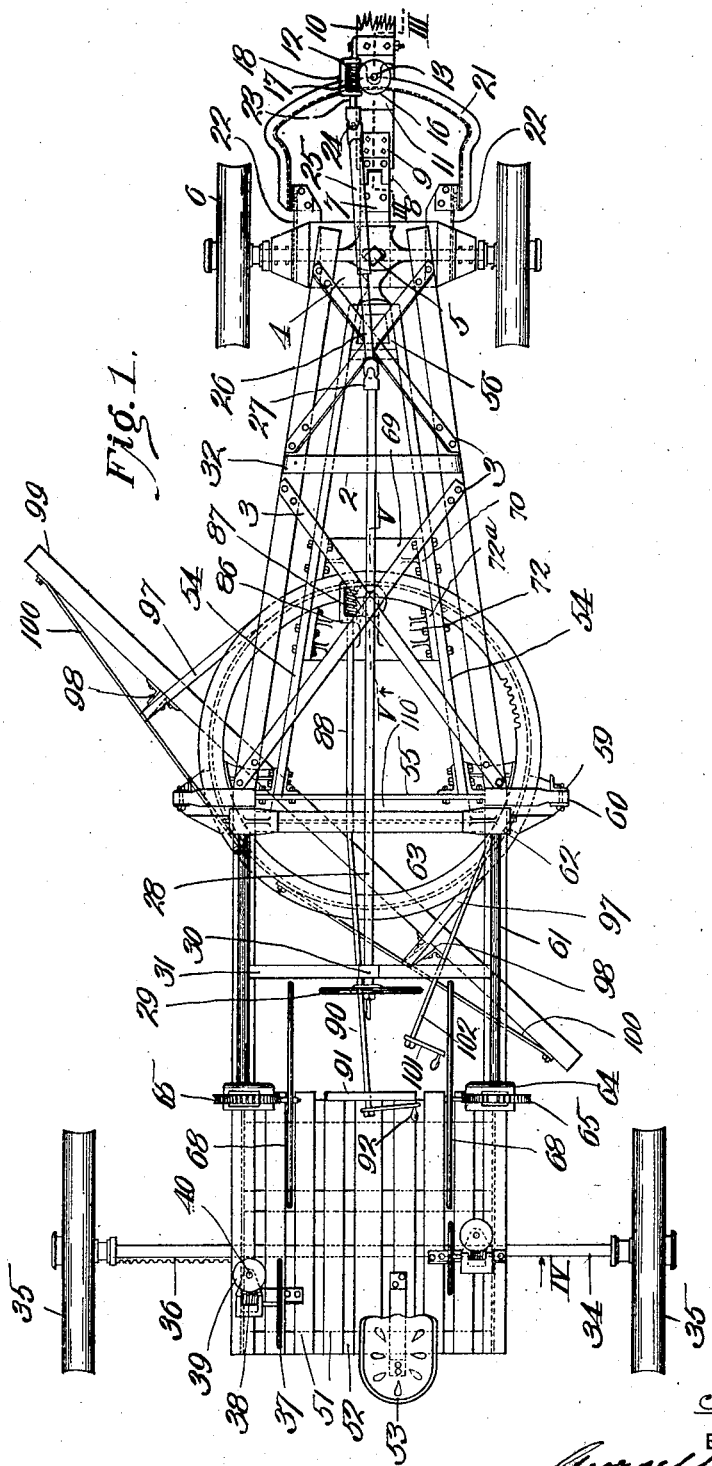
Figure 1, is a plan view of a road grader embodying the invention.

Referring now to the drawings in detail, 1 indicates a pair of arched beams which for the rear half of their length, are parallel and for the front half converge, and said beams are connected at suitable intervals by cross beams 2, the front half of the beams being also connected and stiffened by crossed braces 3.

The front ends of the beams are secured in any suitable manner to a cross plate or frame 4 mounted upon the king bolt 5 extending through the front truck 6 of the machine. Extending forward from the front truck is a draft bar 7 pivotally connected or hinged by a cross pin 8 to a draft plate 9 bolted to the rear end of the tongue 10, the arrangement being such that the tongue is free to move upward and downward when the machine is being drawn over railroad embankments and the like in its transportation from one place of service to another. Bolted to the tongue is a plate 11 and a bracket 12, and journaled vertically in said bracket is a short shaft 13 carrying a gear pinion 15 and a worm gear 16, the latter meshing with a worm 17 journaled in a housing 18 cast with the bracket 12. The plate 11 is provided with an upwardly projecting guide flange 19 just back of gear pinion 15, and engages the inner side of a horizontally arranged and substantially U-shaped yoke 20 extending across and upon plate 11 and equipped at its front side with a segmental gear or rack 21 enmeshing with the said pinion. The yoke 20 is preferably of inverted angle iron and at its rear ends has pin and slot connection 21$^a$ with upwardly projecting parts or brackets of a pair of angle arms 22 projecting forwardly from the front truck, the pin and slot connections accommodating the yoke to up and down movement of the tongue and being necessary because the pivotal action of the hook is around a different center from that of the tongue, as is obvious by reference to Figs. 1 and 3.

The shaft 23 of worm 17, has a universal joint connection 24 with a tubular shaft 25 of angular form in cross section and fitting telescopically on an angular shaft 26 having a universal connection joint 27 with a longitudinal shaft 28. Shaft 28 is operable by a hand wheel 29, and is journaled at its rear end in a bearing 30 swiveled on an arched cross bar 31 connecting bars 1. The shaft also extends through a suitable bearing slidingly mounted in a transversely slotted arched bar 32 connecting bars 1 adjacent the point where the same bend downward at their front ends. This swivel connection for said shaft 28 and the said sliding support for said shaft is to accommodate the same and the connecting telescopic shaft 25—26 in turning movements of the front truck, as when the truck is fully turned, that is until the tongue extends divergingly rearward with respect to the adjacent side bar 1, as common in this class of machine, the front end of the shaft 28 must occupy a vertical plane slightly outward of the plane of the corresponding beam 1, in order that the telescopic steering shaft shall not conflict with or strike against said beam. From the foregoing it will be apparent that proper manipulation of hand wheel 29 will transmit power to the pinion and cause the same through its engagement with the rack bar 21, to turn the front truck to steer the machine in the desired direction. In this connection it should be stated that the hinge pin 8 is designed to be of such strength as to withstand the strain of ordinary service but not excessive strains, that is to say it is intended that said pin shall break in the event the machine encounters a resistance sufficient to threaten injury to the blade or other parts hereinafter described, and it will be noted that should the pin break, the tubular shaft 25 is perfectly free to slip off the front end of shaft 26, the gear pinion carried by the tongue, being of course withdrawn from engagement with the rack bar, the separation therefore taking place without injury to any part except the breakable hinge pin.

Secured to the underside of the right hand beam 1 rearward of the arched portion thereof is a keeper 33 to provide in conjunction with said beam a longitudinal slot wherein the rear axle 34 is capable of swinging back and forth, the axle being equipped at its opposite ends with the customary carrying wheels 35, and secured to said axle at its left hand end is a rack bar 36. 37 is a hand wheel (see Fig. 1) secured on the shaft of a suitably journaled worm 38 meshing with a worm wheel 39 secured on the upper end of a suitably journaled shaft 40, provided at its lower end with a gear pinion (not shown), meshing with the rack bar 36, proper manipulation of the hand wheel through the mechanism described, effecting longitudinal adjustment of the frame upon the shaft. As this adjustment is common in machines of this class, the mechanism is not detailed and of course needs no particular description, it being of course understood that when the axle is pivotally operated as herebefore mentioned, it swings about the center of the shaft 40. The means for maintaining the shaft in proper position to swing about said center, is old and therefore not shown or described.

Secured to the inner side of the right hand beam 1 vertically over axle 34, is a bracket 41 having a depending flange 41ª. A sleeve 42 fitting closely on the axle without interfering with endwise adjustment of the same, is cast integrally with a segmental gear 43, which extends concentrically of the pivotal point of the axle, and said segmental gear has a curved flange 43ª engaging the flange 41ª to hold the quadrant in operative position and in mesh with a pinion 44 on the lower end of a vertical shaft 45 journaled in a bearing standard 46. The shaft 45 is equipped at its upper end with a worm wheel 47 meshing with a worm 48 on shaft 49 journaled in the standard 46, and provided at its inner end with a hand wheel 50, operation of which, through the worm gearing described, causes the pinion to turn the segmental gear and hence swing the axle forwardly or rearwardly as the case may be, for steering purposes. The bearing supports for the worm gearing for effecting endwise adjustment of the rear end of the machine on the axle, and the bearing standard 46 for the mechanism for effecting swinging movements of the axle, are mounted upon a platform comprising foot boards 51 secured upon cross bars 52 secured upon the rear ends of the beams 1, and supported from said platform is a seat 53 for the person in control of the machine.

A frame for supporting the scraper hereinafter identified, comprises a pair of forwardly converging side bars 54 connected at their rear ends to a cross bar 55, and at their front ends by a skeleton rectangular casting 56, through which extends a longitudinal draft rod 57 loosely hinged at its front end to the king bolt 5 so as to be capable of swinging upward and downward and to either side, and 58 is a cushion spring upon said draft rod 57 and arranged to exert rearward pressure upon the rod to act as a cushion or shock absorber when the machine is started in motion through a pull applied upon the tongue or any equivalent of the same, it being understood that certain machines of this class utilize cables or chains in lieu of a tongue, for pulling purposes, and that in this event the bearing bracket 12 and that part of the steering mechanism detachable therewith from the machine in the event the hinge pin breaks, will bear the same relation to the pull cable or chain as it does to the tongue. The cushion connection between the scraper supporting frame and king bolt, is not detailed as it is of common type and forms no novel part of this invention.

59 is a pair of upright lift bars pivotally secured at their lower ends to the outer ends of cross bar 55, and at their upper ends to a pair of crank arms 60 on the front ends of a pair of longitudinal shafts 61, journaled at their front ends in suitable bearings 62 formed at opposite ends of a cross bar 63 and secured to the beams 1. The shafts 61 are journaled at their rear ends in bearing brackets 64 secured to beams 1, and secured upon said shafts are worm wheels 65 meshing with worms 66 having shafts 67 journaled in said brackets 64, and equipped at their inner ends with large hand wheels 68, proper adjustment of which through the mechanism just described, effects raising and lowering of the rear end of the scraper blade supporting frame.

69 is a casting bridging the space between and disposed below the plane of bars 54 of the supporting frame, and provided at its ends with upwardly projecting flanges 70 bolted to said bars, and said casting is provided with an upwardly projecting arcuate rib 71 (Fig. 5) paralleling and adjacent the rear concaved edge of the casting.

A casting 72 is disposed slightly rearward of casting 69 and in a slightly lower plane, and like the latter is provided with upwardly projecting flanges 72ª bolted to bars 54. Midway its width casting 72 is provided with an upwardly projecting boss 73 which is undercut at its front side (see Fig. 5) to accommodate a gear pinion 74 mounted on a short vertical shaft 75 journaled in the boss and casting, and secured upon said shaft at the upper side of the boss is a worm wheel 76 provided with a clutch mechanism 77 normally engaged by the teeth of a clutched member 78 mounted to slide upon and rotate with said shaft to transmit power when clutched with wheel 76, from said wheel to said shaft, as hereinafter explained. A spring 79 is employed to normally hold the clutch member 78 clutched to wheel 76, and to disengage said clutch member from said wheel, a forked bell-crank 80 engages the groove of said clutch member, and is fulcrumed on a standard 81 cast with the boss 73. A pull rod 81ª is pivoted to the upper end of the bell-crank 80 and has a universal joint connection 82 with a pull rod 83, provided with a handle 84 at its rear end within reach of a person on the platform 51, the rear end of the pull rod being supported by an angle plate 85 depending from one of the beams 1.

86 is a housing formed integrally with casting 72 at one side of the boss 73, and fitting in said housing is a worm 87 intergeared with worm wheel 76. The shaft 88 of the worm has a universal joint connection 89 with a shaft 90 journaled in a standard 91 projecting from the foot platform, and to operate shaft 90, a crank handle 92 is secured to its rear end, the operation of said crank handle effecting rotation of the pinion 74 in the desired direction, provided the clutch member and worm wheel 76 are clutched together.

93 is a ring or circular casting fitting between the adjacent edges of castings 69 and 72 and provided with an external flange 94 resting on casting 69, and an internal rack 95 resting on casting 72 and intergeared with pinion 74, so as to be turned when said pinion is operated. To further support the ring or circular casting, the flange 94 extends through grooves formed at the outer ends of cross bar 55 by bending the extremities of said bar downward and inward as at 96, it being noted by reference to Figs. 1 and 2, that said bar is disposed rearward of the axis of the ring or circular casting and hence coöperates with the castings 69 and 72 in supporting the circular casting properly balanced.

97 are curved arms secured to opposite sides of the ring 93, and pivoted at their lower ends to plates 98 secured to the rear or convex side of a longitudinal scraper blade 99, and said blade is further supported against movement by braces 100 secured at their opposite ends to the blade and to the ring or circular casting and with the latter constituting a truss brace for the blade. This construction involves nothing novel in machines of this character and needs no more detailed description.

101 is a crank handle accessible from the foot platform, for turning a shaft 102 journaled in cross bar 85, and having a universal joint connection 103 with a short shaft 104 journaled in a bearing bracket 105 depending from right hand side beam 1, said shaft 104 being equipped with a beveled gear 106 meshing with a beveled gear 107 rigidly mounted on a transverse worm shaft 108 suitably journaled at its ends in bearings 109 depending from the side beams 1, and engaging said worm is a block 110 slidingly mounted upon the cross bar 63, and pivotally connecting said slide block with the scraper blade supporting frame, is an inclined rod 111, the connection between said rod and the supporting frame not being detailed as it forms no novel part of the machine and no claim is made to it. Operation of the crank handle 101 through the connections last described effects lateral or horizontal swinging movement of the scraper blade supporting frame so that it may be possible to cause the blade to cut more deeply into an embankment at the side of the machine for road widening purposes, or to withdraw the blade to avoid outcropping rock or the like which would interfere with the progress of the same. By means of the crank handle 92, the ring or circular frame 93 can be turned to change the angle of the scraper blade to the line of draft, the adjustment being extended far enough, if desired, to reverse the angle of the blade so that it shall deflect the earth which accumulates in front of it, toward the opposite side of the machine from that toward which it deflects the earth as arranged as shown in Fig. 1.

The manipulation of the wheels 68 effects the lifting and lowering of the scraper blade, and by the operation of but one of them, it is obvious that one end of the blade will be raised, as such operation tends to tilt the blade supporting frame laterally.

It occasionally happens through the running of one of the front wheels into a hollow in the road, that the gear 15 and gear rack 21 are thrown out of engagement, this being due to the fact that when the front truck is tilted from the cause mentioned, the tongue is not ordinarily affected except through the twist strain or jerk imposed upon it.

Figure 6:
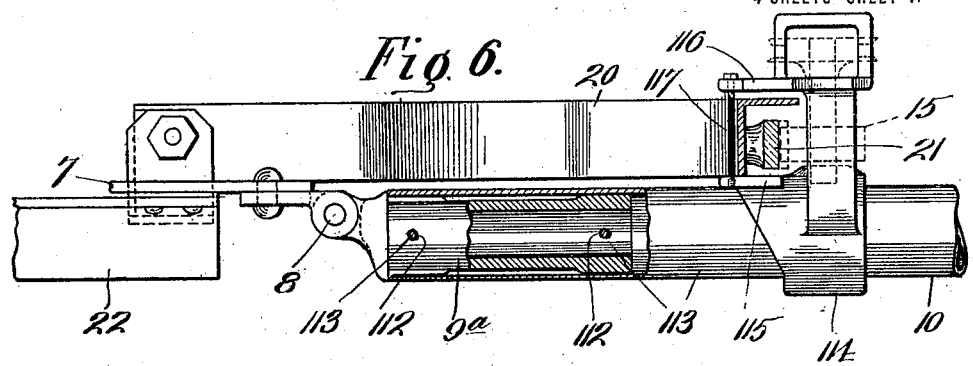
Fig. 6, is a fragmentary elevation, with parts in section of tongue connections of the machine of different construction from those shown in the preceding figures.
Figure 7:
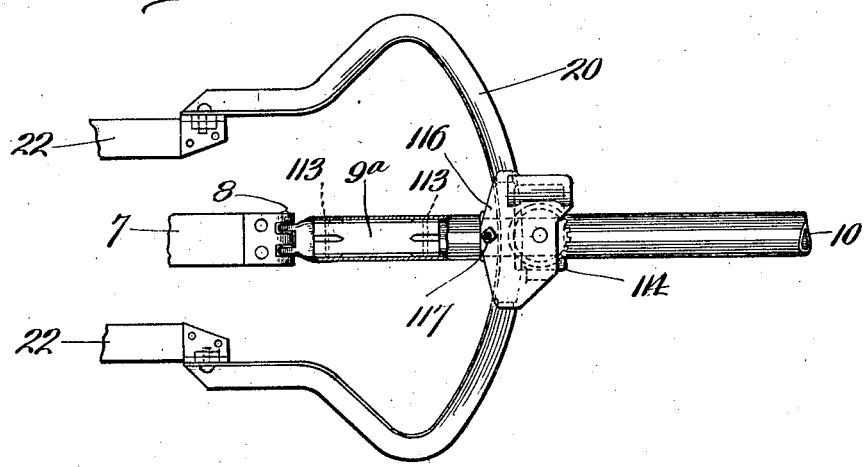
Fig. 7, is a plan view of the construction shown by Fig. 6.
Figure 8:
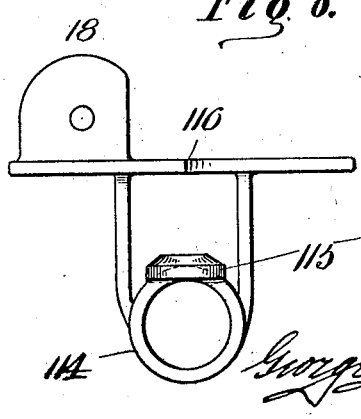
Fig. 8, is a rear view of the bracket slidingly mounted on the tongue.

To avoid the trouble mentioned I have provided the construction shown by Figs. 6 to 8 inclusive, in which construction the tilting of the front truck will not disturb the relation between the pinion 15 and the segmental rack bar 21. In the construction last-mentioned the tongue 10 is of cylindrical form and hollow and fits at its rear end upon a cylindrical stem 9$^a$ hinged to pin 8, and said stem is provided with openings 112 engaged by pin 113 secured to the tubular tongue, the said pin being adapted to break in the event excessive pulling strains are imposed on the tongue, and thus permit the latter to become disconnected from the hinge member 9$^a$.

A bracket forming a support for shaft 14 and a substitute for bracket 12, is provided with a sleeve 114 fitting rotatably on the tongue, and said bracket is maintained in upright position so that the pinion 15 shall be held in engagement with the rack bar 21 by the provision of an arm 115 underlying the yoke 20, an arm 116 overlying said yoke, and a bolt 117 connecting said arms within the yoke. It will thus be seen that the tongue can be withdrawn without carrying with it the said bracket as was true of the construction shown by Figs. 1 to 5 inclusive. It will also be apparent that the tilting of the yoke through tilting actions of the front truck, will simply result in rotation of the same around the tongue and hence maintain the pinion and the segmental rack in their proper relative positions.

As the function of the various parts have been set forth in detail no recapitulation of the operation is believed to be necessary. The embodiment of the invention disclosed by the drawings represent the preferred construction, but it is to be understood that I reserve the right to make all changes which fall within the principle and scope of the appended claims.

I claim:

1. In a grading machine, a wheel frame, a supporting frame below the wheel frame, a ring journaled on the supporting frame, a scraper blade adjustably supported from and around the ring, a vertical shaft geared to said ring, a worm wheel journaled on said shaft, a worm engaging said wheel, a clutch yieldingly clutched to said worm wheel to lock the same to the shaft, and manually operable means for disengaging said clutch from said wheel.

2. In a grading machine, an arched wheeled frame, a supporting frame within the arch of the wheeled frame, a ring journaled on the supporting frame, a scraper blade carried by the ring, a vertical shaft journaled on said supporting frame, a worm journaled on said frame, a worm wheel journaled on said shaft and meshing with said worm and provided with clutch teeth, a clutch member rotatable with and slidable on said shaft, a spring for holding said clutch member normally clutched with said worm wheel, a pinion rigid on said shaft, a circular rack provided on the inner side of said ring and meshing with said pinion, manually operable means to turn the worm, and manually operable means to unclutch the worm wheel.

In testimony whereof I affix my signature.

JOHN R. KEY.